United States Patent
Vazquez et al.

(10) Patent No.: US 9,525,460 B1
(45) Date of Patent: Dec. 20, 2016

(54) MECHANISM FOR XDSL-PLC INTERFERENCE MITIGATION

(71) Applicant: Marvell International Ltd., Hamilton (BM)

(72) Inventors: Marcos Martinez Vazquez, Barcelona (ES); Agustin Badenes Corella, Valencia (ES)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/812,978

(22) Filed: Jul. 29, 2015

Related U.S. Application Data

(60) Provisional application No. 62/030,870, filed on Jul. 30, 2014.

(51) Int. Cl.
*H04B 3/00* (2006.01)
*H04B 3/48* (2015.01)
*H04B 3/54* (2006.01)

(52) U.S. Cl.
CPC .............. *H04B 3/48* (2013.01); *H04B 3/542* (2013.01); *H04B 2203/5425* (2013.01); *H04B 2203/5495* (2013.01)

(58) Field of Classification Search
CPC ............ H04B 3/48; H04B 3/542; H04B 3/32; H04B 3/54; H04B 3/487; H04B 2203/5445; H04B 2203/5441; H04B 2203/5495; H04B 2203/5425; H04W 88/085
See application file for complete search history.

(56) References Cited

U.S. PATENT DOCUMENTS

| | | | | |
|---|---|---|---|---|
| 2014/0307572 A1* | 10/2014 | Mungall | ................ | H04J 3/025 370/252 |
| 2014/0369430 A1* | 12/2014 | Parnell | ...................... | H04B 3/32 375/257 |
| 2015/0009793 A1* | 1/2015 | Schwager | ................ | H04B 3/32 370/201 |
| 2015/0365256 A1* | 12/2015 | Afkhami | ............. | H04L 12/4625 375/257 |

OTHER PUBLICATIONS

"Recommendation ITU-T G.9960 Unified high-speed wireline-based home networking transceivers—System architecture and physical layer specification," Telecommunication Standardization Sector of ITU, Dec. 2011.

* cited by examiner

*Primary Examiner* — Syed Haider

(57) ABSTRACT

Systems and techniques relating to interference mitigation between power line communication (PLC) and digital subscriber line (xDSL) networks are described. A described technique includes detecting a power line communication node associated with the power line communication network in response to a detection of activity associated with the digital subscriber line network, the power line communication node being configured to transmit signals on the power line communication network in accordance with a power mask; controlling the power line communication node to transmit one or more measurement frames on the power line communication network; determining interference on the digital subscriber line network that is caused by the one or more measurement frames transmitted by the power line communication node; and controlling the power line communication node to adapt the power mask for transmissions on the power line communication network to reduce the interference on the digital subscriber line network.

17 Claims, 7 Drawing Sheets

MECHANISM FOR XDSL-PLC INTERFERENCE MITIGATION

CROSS REFERENCE TO RELATED APPLICATIONS

This disclosure claims the benefit of the priority of U.S. Provisional Application Ser. No. 62/030,870 filed Jul. 30, 2014, titled "MECHANISM FOR XDSL-PLC INTERFERENCE MITIGATION." The above-identified application is incorporated herein by reference in its entirety.

BACKGROUND

Power lines typically provide alternating current (AC) to connected equipment. However, power lines can also provide a medium for bidirectional communications among connected equipment. Connected equipment can include communication circuitry to transmit and receive power line communication (PLC) signals via power lines. Various standards covering PLC technology include G.hn and G.9960 from the International Telecommunication Union Telecommunications (ITU-T) and 1901 from the Institute of Electrical and Electronic Engineers (IEEE). Further, connected equipment can communicate via a digital subscriber line (DSL) network. Different types of DSL connections are possible such as a symmetric digital subscriber line (SDSL), asymmetric digital subscriber line (ADSL), or very-high-bit-rate digital subscriber line (VDSL). Note that xDSL can refer to any DSL technology such as SDSL, ADSL, VDSL, or G.fast based DSL.

SUMMARY

The present disclosure includes systems and techniques related to interference mitigation between PLC and DSL networks. According to an aspect of the described systems and techniques, a technique includes detecting a power line communication node associated with the power line communication network in response to a detection of activity associated with the digital subscriber line network, the power line communication node being configured to transmit signals on the power line communication network in accordance with a power mask; controlling the power line communication node to transmit one or more measurement frames on the power line communication network; determining interference on the digital subscriber line network that is caused by the one or more measurement frames transmitted by the power line communication node; and controlling the power line communication node to adapt the power mask for transmissions on the power line communication network to reduce the interference on the digital subscriber line network.

These and other implementations can include one or more of the following features. A detection of activity on a digital subscriber line network can include a detection of an activation of a digital subscriber line link. Implementations can include monitoring an error rate associated with the digital subscriber line network; causing the power line communication node to transmit one or more measurement frames on the power line communication network in response to the error rate exceeding a threshold; and controlling the power line communication node to adapt a different power mask for its transmissions on the power line communication network to reduce interference on the digital subscriber line network. Controlling the power line communication node to adapt the power mask can include communicating with a domain master associated with the power line communication network, and wherein the domain master is configured to send a frame that contains a power mask specification to the power line communication node. Controlling the power line communication node to transmit the one or more measurement frames can include controlling the power line communication node to transmit one or more trains of Medium Access Plan Default (MAP-D) frames during first medium access control (MAC) cycles; and controlling the power line communication node to be silent during second MAC cycles. Determining the interference can include measuring active interference during the first MAC cycles; measuring baseline interference during the second MAC cycles; and determining power line communication interference based on a comparison of the active interference and the baseline interference.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiments can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a smart phone, a personal digital assistant (PDA), a mobile computer, a digital camera), a general purpose data processing apparatus such as a computer, or combinations of these.

Particular configurations of the technology described in this document can be implemented so as to realize one or more of the following potential advantages. A described technology can reduce interference to DSL communications from PLC communications. A described technology can optimize end-to-end throughput including a DSL segment and a PLC segment. A described technology can apply to technologies such as ITU-T G.hn, IEEE 1901, HomePlug AV and AV2, HD-PLC, or other technologies that can create interference in a xDSL frequency range.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

PLC networks may have an impact on the performance of xDSL networks. In more detail, a PLC network may cause interference to a xDSL network such that throughput provided by the xDSL network is reduced. A typical multi-segment channel, for example, can include a xDSL access segment and a PLC based in-home segment with the access segment providing Internet connectivity to the in-home segment.

The final throughput perceived by the user ($XPUT_{USER}$) when using an access service is the minimum throughput provided by the access segment ($XPUT_{ACCESS}$) and in-home segment ($XPUT_{IH}$):

$$XPUT_{USER}=MIN(XPUT_{ACCESS}, XPUT_{IH}).$$

Note that $XPUT_{ACCESS}$ can be lower than $XPUT_{IH}$ and thus a loss of throughput in the access segment had a direct impact on the final throughput perceived by the user. With the advent of full fibre and fibre-to-the-distribution-point (FTTdp) and other high-speed network architectures, this rule is no longer valid, and $XPUT_{IH}$ may become the limiting factor in some topologies, e.g., using wireline, wireless, or a combination of both. This way, it is important to maximize the $XPUT_{USER}$ by finding the correct operating condition of both segments of the communication channel. For this, it is preferable to diagnose interference and operate both segments—e.g., the access segment and the in-home segment—to maximize the final throughput perceived by the user. For example, if a xDSL network is the limiting bandwidth, communications on a corresponding PLC network can be restricted so as to not further impede on the bandwidth provided by the xDSL network to the PLC network.

Figure 1:
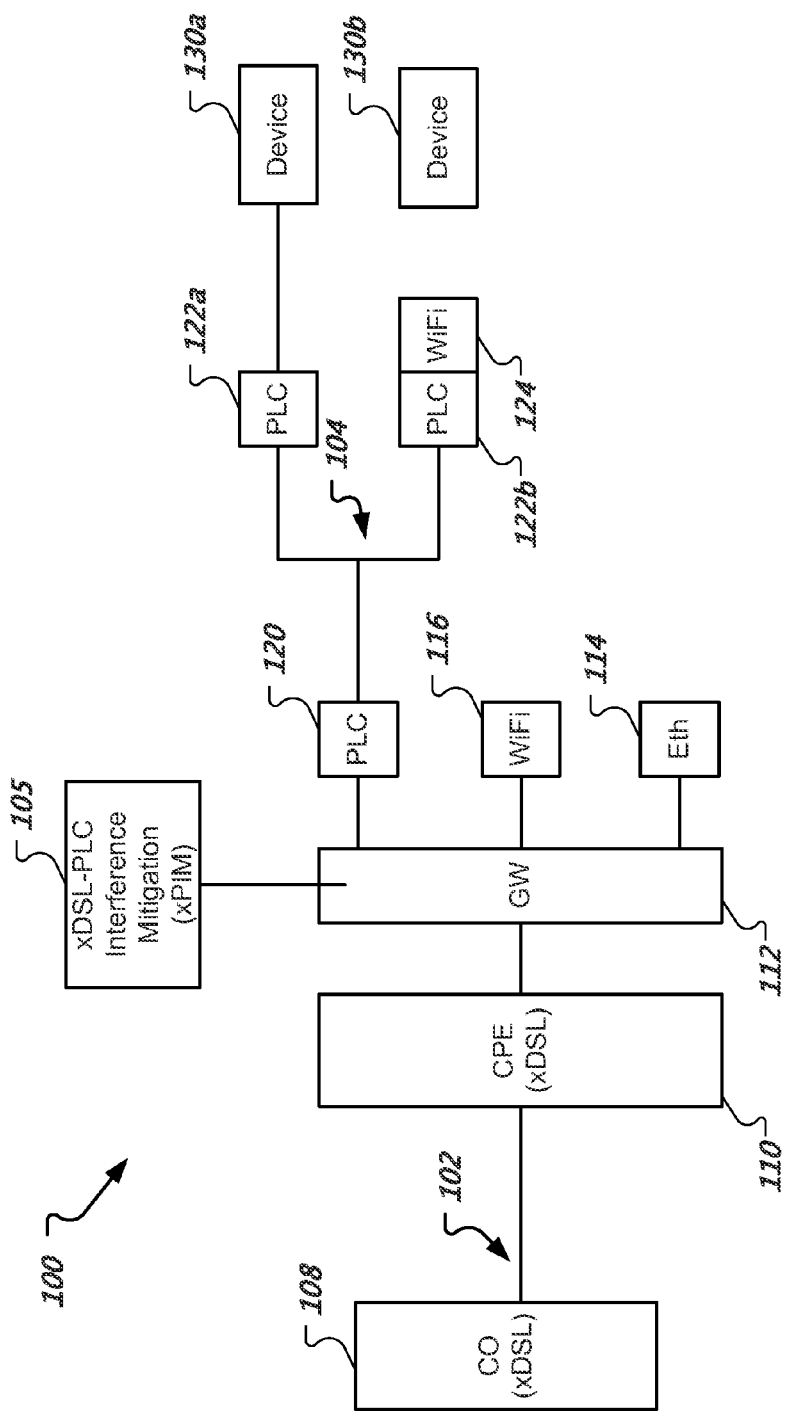
FIG. 1 shows a high-level architecture of an example of a system that performs xDSL-PLC interference mitigation.

FIG. 1 shows a high-level architecture of an example of a system that performs xDSL-PLC interference mitigation. A central office (CO) 108 can provide network connectivity to various locations. A location such as a residence or a business can include a system 100 to receive and distribute data connectivity for a network such as the Internet. The system 100 can include customer premise equipment (CPE) 110, gateway 112, and devices 130a-130b. The central office (CO) 108 can provide a xDSL service, which can be referred to as a DSL service in general, to the CPE 110. In this example, the gateway 112 can bridge networks such as a xDSL network 102 and a PLC network 104. The gateway 112 can be configured to perform a xDSL-PLC interference mitigation (xPIM) technique 105 to reduce or eliminate interference from the PLC network 104 to the xDSL network 102.

The gateway 112 can route data traffic between the CPE 110 and devices 130a-130b via one or more interfaces such as PLC, WiFi (e.g., IEEE 802.11 based, etc.), and Ethernet. In some implementations, the gateway 112 can include a PLC node 120, WiFi interface 116, Ethernet interface 114, or a combination thereof. Within the system 100, PLC node 120 and PLC nodes 122a-122b can form a PLC network via one or more power lines. In some implementations, a PLC node 122a provides data connectivity to a device 130a via a wireline connection. In some implementations, a PLC node 122b provides data connectivity to a device 130b via a wireless connection by using a WiFi interface 124.

The CPE 110 and the gateway 112 can be co-located. The PLC node 120 closest to the gateway 112 (or alternatively within, if PLC node 120 is within the gateway 112) may contribute the most interference to the xDSL network 102 network associated with CPE 110. However, other PLC nodes 122a-122b may contribute more or less interference to the xDSL network 102.

In some implementations, the xDSL network 102 and PLC network 104 are managed by TR-069 (Technical Report 069, entitled CPE WAN Management Protocol, published by the Broadband Forum). In some implementations, the xDSL network 102 is managed by TR-069, whereas the PLC network 104 is not managed or includes non-managed nodes such as retail nodes. In some implementations, the xDSL network 102 and PLC network 104 are not managed. In some implementations, the PLC network 104 is based on ITU-T G.hn PLC technology, however other PLC technologies are possible.

The xPIM technique 105 can include a discovery procedure, a measurement procedure, and a negotiation procedure. A discovery procedure is performed to find new PLC nodes or networks. A discovery procedure can be launched when an xDSL link within the xDSL network 102 is activated. In some implementations, a discovery procedure is launched by the gateway 112 whenever such a discovery procedure is needed, e.g., based on a detection of an increased number of errors or detection of a new PLC node. A measurement procedure can measure the interference from one or more PLC nodes 120, 122a-122b. A measurement procedure can be launched periodically, based on a detection of an increased number of errors on a xDSL link, or both. The negotiation procedure includes negotiating between the gateway 112 and one or more PLC nodes 120, 122a-122b to achieve an optimum operating point.

The gateway 112 can use a layer 2 protocol such as Layer 2 Configuration and Management Protocol (LCMP) to communicate with the one or more PLC nodes 120, 122a-122b. Other types of layer 2 protocols are possible such as a protocol that is not IP based. LCMP allows exchange of parameters such as read or write parameters between a PLC node and an external entity through the Ethernet interface of the PLC node. LCMP frames can be embedded in Ethernet frames. In some implementations, LCMP messages are encapsulated into G.hn in-band management messages. In some implementations, one of the one or more PLC nodes 120, 122a-122b can become a domain master (DM), which can control and manage the PLC network 104.

Figure 2:
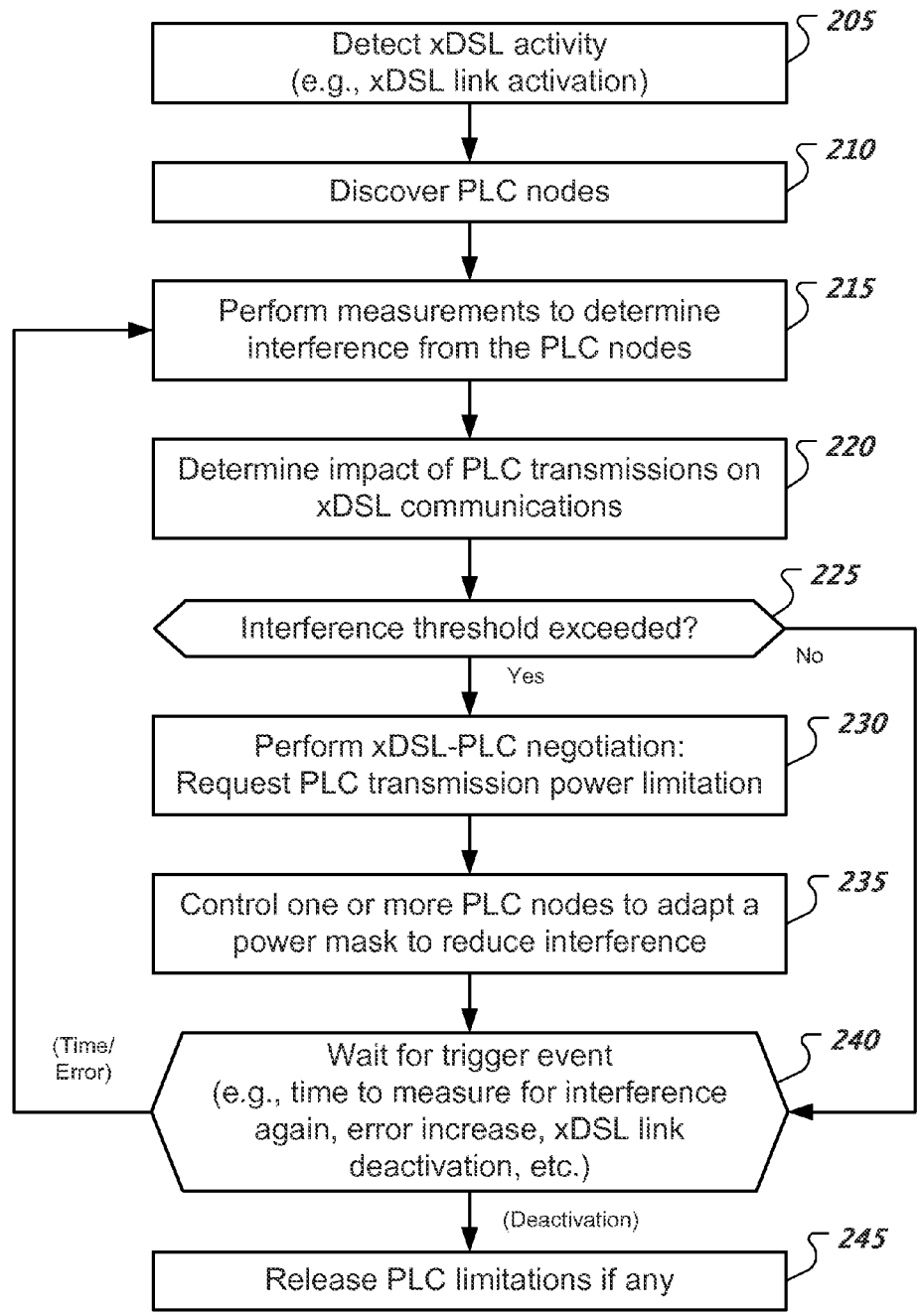
FIG. 2 shows a flowchart of an example of a xDSL-PLC interference mitigation process.

FIG. 2 shows a flowchart of an example of a xDSL-PLC interference mitigation process. In some implementations, at least a portion of the xDSL-PLC interference mitigation process can be performed by a gateway. At 205, the process detects xDSL activity such as a xDSL link activation. Detecting a xDSL link activation can include sensing that a DSL interface connector on a gateway has been coupled to an active DSL network. Detecting a xDSL link activation can include receiving a packet over a DSL interface or receiving a message indicating that DSL connection setup is complete. At 210, the process discovers PLC nodes. Discovering PLC nodes can include sending one or more LCMP messages and detecting responses from PLC nodes to those messages.

At 215, the process performs measurements to determine interference from the PLC nodes. For example, the process can include controlling a discovered PLC node to transmit one or more frames over a PLC network during one or more active portions of a measurement window and controlling all nodes to be silent on the PLC network during one or more silent portions of the measurement window. In some implementations, the process includes operating a device such as a CPE or gateway to collect measurements. In some implementations, the process includes performing a Fourier transformation such as a Fast Fourier Transformation (FFT) and measuring the power in each of the FFT tones. In some implementations, two or more FFTs can be performed on two or more sample groups during the active portions and an active average tone power is determined for one or more tones. Further, two or more FFTs can be performed on two or more sample groups during the silent portions and a baseline average tone power is determined for one or more tones.

At 220, the process determines the impact of PLC transmissions on xDSL communications. The process can measure active interference on the DSL network during the one or more active portions. The process can measure baseline noise without interference on the DSL network during the one or more silent portions. The process can determine PLC interference based on a comparison of the active interference and the baseline noise without interference. In some implementations, the process can include comparing one or more active average tone powers with one or more baseline average tone powers.

At 225, the process determines whether an interference threshold is exceeded, e.g., whether the PLC interference exceeds a predetermined value. If the interference threshold is not exceeded, the process, at 240, can wait for a predetermined amount of time and then perform a new set of measurements. In some implementations, the process can include determining whether the measured interference would reduce an achievable signal-to-noise ratio (SNR); such determining can include computing a potential loss in capacity due to that SNR reduction. For example, if the capacity would be reduced below what is assigned or committed to the customer, the PLC power spectral density (PSD) can be reduced. Otherwise, if there is enough capacity, the process can maintain current operating parameters such as PLC PSD, and wait for the next trigger event at 240.

If the interference threshold is exceeded, the process, at 230, performs a xDSL-PLC negotiation. A xDSL-PLC negotiation can include requesting a PLC transmission power limitation such as controlling one or more PLC nodes to adapt their power outputs based on a power mask so that each of their corresponding PSD can be reduced. In some implementations, a negotiation can include requesting an adaptation of the PSD of the power line network in order to find the best operating point. At 235, the process controls one or more PLC nodes to adapt a power mask to reduce interference. In some implementations, controlling the PLC node to adapt the power mask can include communicating with a domain master associated with the PLC network. The domain master can be configured to send a frame that contains a power mask specification to a PLC node. In some implementations, a xDSL-PLC negotiation can include sending a power reduction request to a domain master. In some implementations, controlling the PLC node to adapt the power mask can include sending a power mask specification to a PLC node in response to a power reduction request. In some implementations, a power mask specification can specify a maximal power output of a node. In some implementations, a power mask specification can include one or more frequency bands and one or more corresponding reductions in power. In some implementations, a reduction can be specified in decibels (dB). In some implementations, a power mask specification can include break points with an absolute value of the maximum power level a device can use per carrier.

At 240, the process waits for a trigger event. In some implementations, if a periodic measurement timer expires, the process can perform a new set of measurements at 215. In some implementations, if xDSL communication errors exceed a threshold, the process can perform a new set of measurements at 215. For example, if the number of corrupted packets received on a xDSL interface per measurement window is greater than a predetermined value (e.g., one, two, five, etc.), the process can perform a new set of measurements. In some implementations, if the process detects a xDSL link deactivation, the process can release PLC transmission power limitations, if any, at 245.

Figure 3:
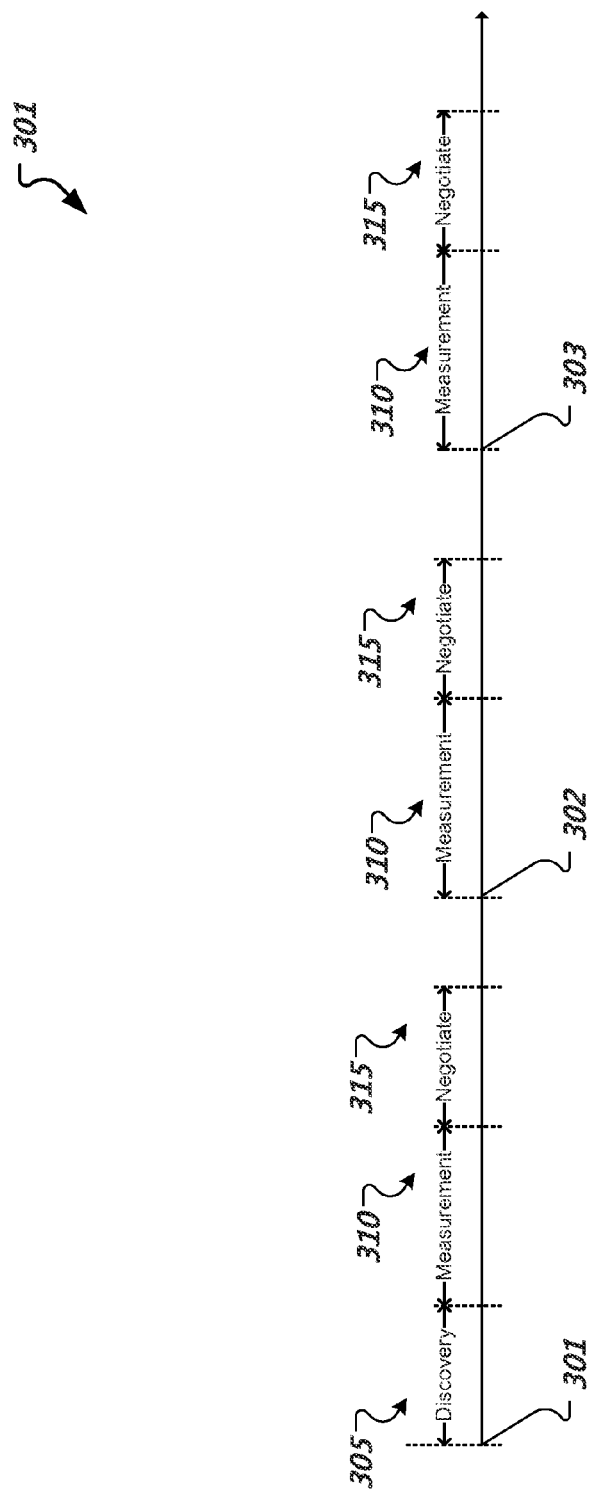
FIG. 3 shows a procedure timing diagram of an example of a xDSL-PLC interference mitigation technique.

FIG. 3 shows a procedure timing diagram 301 of an example of a xDSL-PLC interference mitigation technique. A xDSL-PLC interference mitigation technique can include a discovery procedure 305, measurement procedure 310, and negotiation procedure 315. A trigger 301, such as a DSL link activation, can start the discovery procedure 305.

The discovery procedure 305 can start when an xDSL line is activated. At this moment, the gateway can send an LCMP discovery message to a home network to indicate the presence of the gateway to the home network, and discover PLC nodes. Once a PLC node receives a discovery LCMP frame from its local Ethernet interface, the PLC node may infer that the PLC node is connected either directly or through other devices to the gateway and will inform a domain master of the PLC node of such a connection. In some implementations, the gateway can periodically start the discovery procedure 305 to discover new PLC nodes, removal of PLC nodes, or other topology changes.

The domain master can start a measurement procedure 310 by causing the PLC node to transmit measurement frames such as Medium Access Plan Default (MAP-D) frames, data frames, or probe frames, e.g., PROBE frames as described by G.9960. For example, once a domain master of a G.hn domain receives information from the discovered PLC node, the domain master can create an opportunity to allow the PLC node to signal a presence of the PLC node to the xDSL network, e.g., to cause potential interfering PLC transmissions. In some implementations, the PLC node can transmit MAP-D frames within an inter-domain communication channel (IDCC) window of a G.hn domain. An IDCC window can occur within a medium access control (MAC) cycle. In some implementations, only one PLC node within a domain is allowed to transmit in the IDCC window at a time. In some implementations, the duration of the window is configurable, but should be long enough to enable the gateway to detect several transitions within the PLC network. In some implementations, a duration of an IDCC window can be 1, 5, or 10 milliseconds long—other durations are possible.

A negotiation procedure 315 can include sending a message into the PLC network to cause one or more PLC nodes to reduce their PSD output. Another trigger 302 such as a timer expiration can cause a new measurement procedure 310 to be performed and, if required, also cause another negotiation procedure 315 to be performed. Further, another trigger 303 such as a DSL error event can cause a new measurement procedure 310 to be performed and, if required, also cause another negotiation procedure 315 to be performed. For example, a gateway can monitor an error rate, e.g., a packet error rate or a bit error rate, associated with the xDSL network. The gateway can cause the PLC node to transmit one or more measurement frames on the PLC network in response to the error rate exceeding a threshold. The gateway can control the PLC node to adapt a different power mask for transmissions by the PLC node on the PLC network to reduce interference on the xDSL network.

Figure 4:
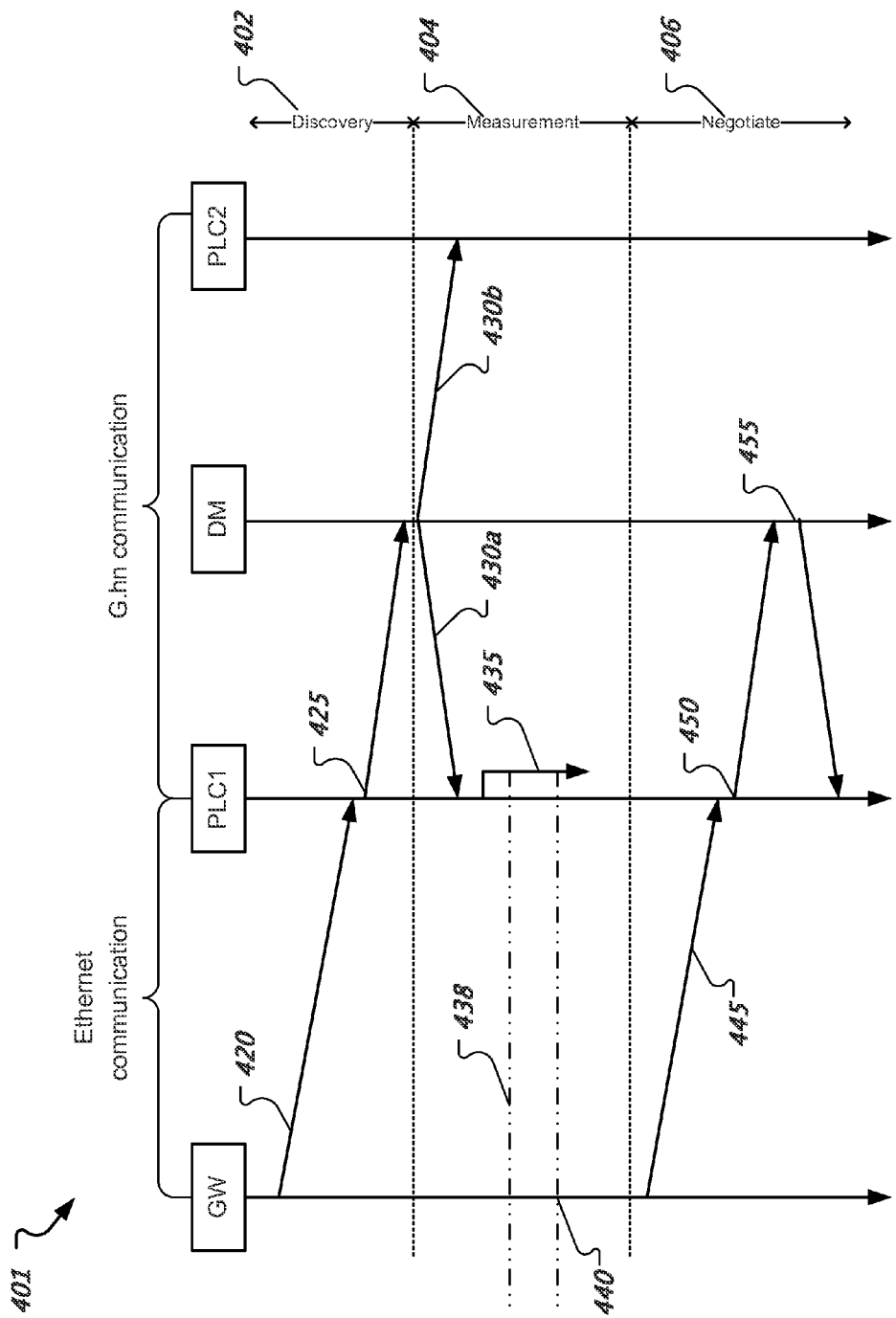
FIG. 4 shows a message flow diagram of an example of a xDSL-PLC interference mitigation process.

FIG. 4 shows a message flow diagram 401 of an example of a xDSL-PLC interference mitigation process. The diagram 401 shows message traffic among a gateway (GW), PLC nodes labelled PLC1 and PLC2, and a domain master (DM) during several phases including a discovery phase 402, measurement phase 404, and negotiation phase 406. The GW is coupled with a xDSL network. The GW and PLC1 communicate via Ethernet. The PLC1, DM, and PLC2 form a PLC network and communicate via G.hn. At 420, the GW sends a discovery message over Ethernet to find a PLC node using a LCMP broadcast. At 425, PLC1 receives a frame containing the discovery message from its Ethernet port and infers that it is connected to the GW, and informs its DM by using a G.hn management message.

At 430a, in response to receiving the management message, the DM instructs PLC1 to send MAP-D frames in an IDCC window. At 430b, the DM instructs the rest of the PLC nodes, if any, to be silent in the IDCC window. At 435, PLC1 broadcasts a train of MAP-D frames in the IDCC window. The train of MAP-D frames may cause interference 438 to ongoing xDSL communications. In some implementations, the whole IDCC window is reserved for PLC1 to broadcast frames. In some implementations, a portion of the IDCC is reserved for PLC1 to broadcast frames.

At 440, the GW detects the impact of the MAP-D transmissions in xDSL communications. If the GW observes a threshold exceeding level of interference, the GW, at 445, can send a request frame to limit the power of PLC transmissions of PLC1. At 450, PLC1 receives the request frame from its Ethernet port, analyzes the request frame, and sends the relevant information to the DM. At 455, DM instructs PLC1 to reduce its power mask to reduce the interference.

Figure 5:
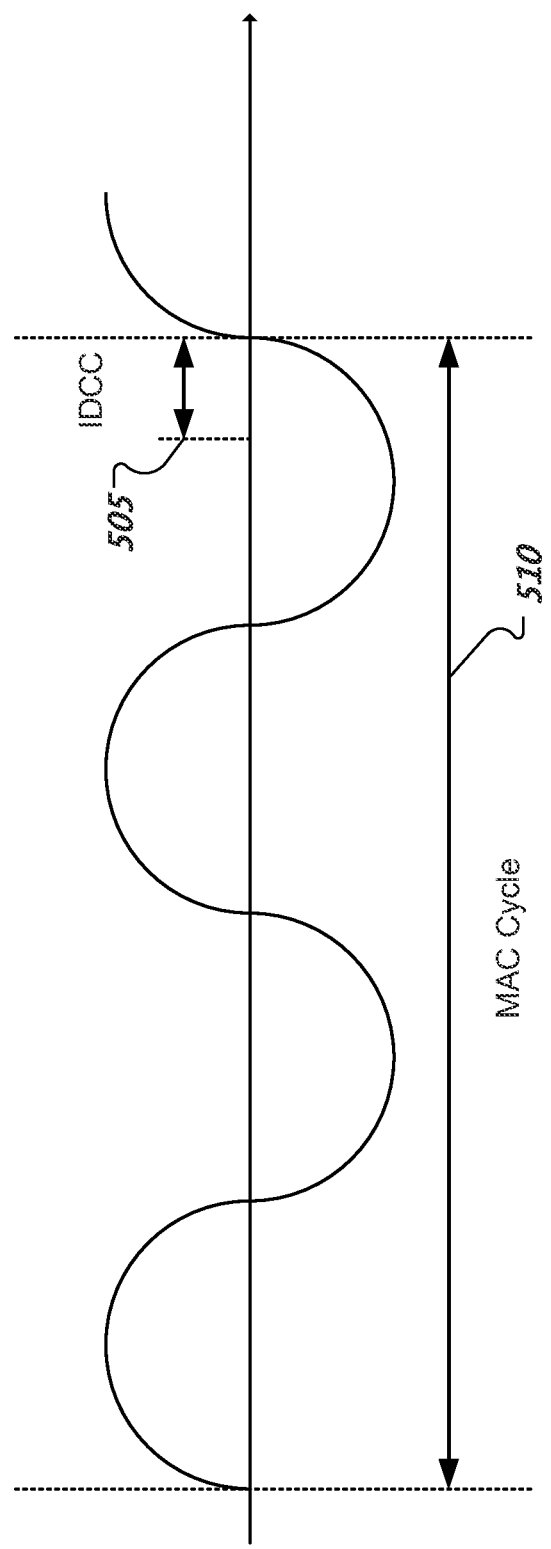
FIG. 5 shows an example of an inter-domain communication channel window within a medium access control cycle that is associated with a measurement procedure.

FIG. 5 shows an example of an IDCC window 505 within a MAC cycle 510 that is associated with a measurement procedure. In this example, the IDCC window 505 is a predetermined duration of time, e.g., 1 millisecond, of the MAC cycle 510, e.g., 40 milliseconds. The IDCC window 505 is a part of the MAC cycle 510 of a G.hn domain that can be used for communication between different G.hn domains, e.g., neighboring domains. For the IDCC window 505, the DM decides which PLC node should transmit a measurement frame.

Figure 6:
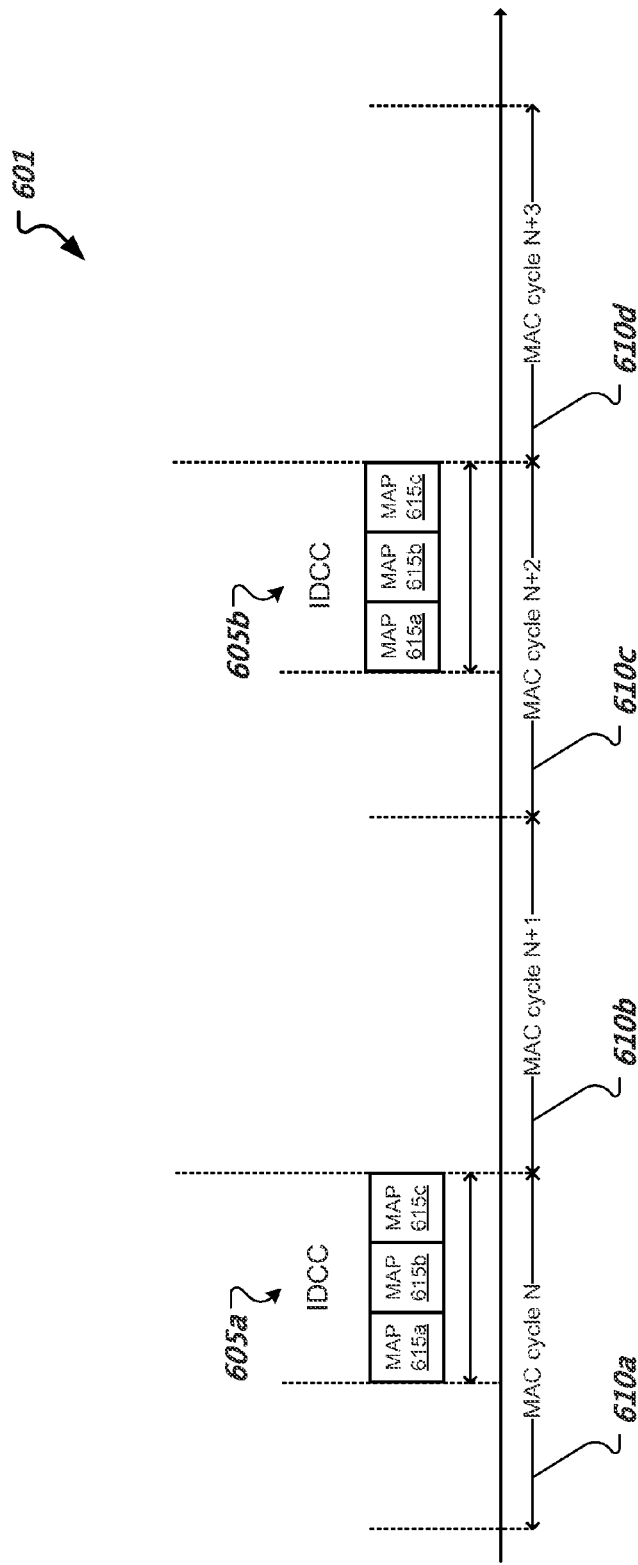
FIG. 6 shows an example of medium access plan transmissions within inter-domain communication channel windows that are associated with a measurement procedure.

FIG. 6 shows an example of MAP transmissions within IDCC windows that are associated with a measurement procedure. A domain master can control PLC node transmissions during a xPIM measurement window 601. The domain master can instruct a PLC node connected to a gateway to send a train of MAP-D frames 615a, 615b, 615c in IDCC windows 605a, 605b that are established in even numbered MAC cycles 610a, 610c during the measurement window 601. The domain master can instruct other PLC nodes of the domain to remain silent during the IDCC windows 605a, 605b. Further, the domain master can instruct all PLC nodes of the domain to be silent on odd numbered MAC cycles 610b, 610d during the measurement window 601. In some implementations, the domain master can instruct a PLC node that is not connected to a gateway to send a train of MAP-D frames during the measurement window 601.

A xPIM technique can calculate the noise floor and the active interference created by PLC communications. The noise floor, or baseline interference, can be measured when PLC communications are not present. In the example of FIG. 6, baseline noise without interference can be measured during the odd numbered MAC cycles 610b. 610d of the measurement window 601. The active interference can be measured during the even numbered MAC cycles 610a, 610c of the measurement window 601. The xPIM technique can include comparing the baseline noise without interference with the active interference to determine PLC interference. In some implementations, the xPIM technique computes a difference between the noise during a period of time where a PLC node transmits and the noise floor. In some implementations, a gateway can measure the channel conditions in periods of 1 millisecond during two MAC cycles. In order to avoid the need of synchronizing the MAC cycle with a CPE, an oversampling can be performed (e.g., in periods of 0.5 milliseconds) to guarantee that a measuring period falls within an IDCC window. For example, the xPIM technique can include measuring PSD values during two full MAC cycles in slots of 0.5 milliseconds. The interference, $PSD_{Interference}$, produced by the PLC node can be given by (assuming a MAC cycle of 40 ms):

$$PSD_{Interference} = MAX_{i=0:79}(PSD_i - PSD_{i+40})$$

where, i is slot index correspond to a slot of 0.5 milliseconds of which there are 80 slots in this example and $PSD_i$ is the PSD measured in the i-th slot. Here, the $PSD_{Interference}$ represents the maximal difference of PSD measurements between slots with and without PLC communications.

Once the interference from the PLC node is determined, the xPIM technique can determine whether a PSD reduction is required, e.g., if $PSD_{Interference}$ exceeds a threshold. If required, the technique can send a LCMP message to the PLC network via the PLC node in order to ask for a reduction of the transmit PSD through the "Per-node transmit PSD shaping" mechanism of G.hn. Once the per-node transmit PSD shaping is applied, the xPIM technique can continue to monitor the networks in order to determine whether further PSD reductions are required or whether to allow PLC nodes to increase their PSD outputs.

Figure 7:
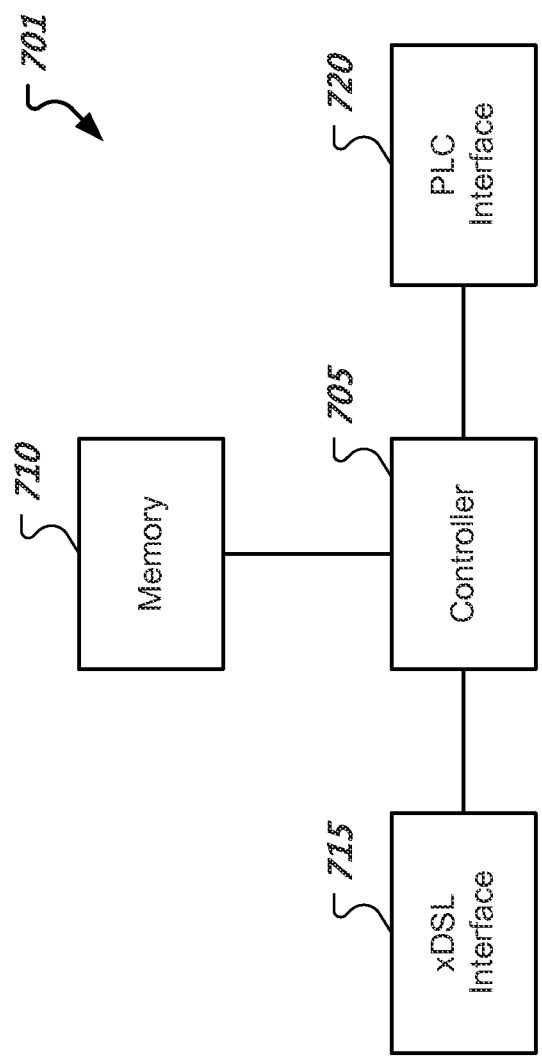
FIG. 7 shows a high-level architecture of an example of a gateway that performs xDSL-PLC interference mitigation.

FIG. 7 shows a high-level architecture of an example of a gateway 701 that performs xDSL-PLC interference mitigation. The gateway 701 can include a controller 705, memory 710, and interfaces such as a xDSL interface 715 and a PLC interface 720. In some implementations, the PLC interface 720 is an Ethernet interface that is intended to be coupled with a PLC node. In some implementations, the gateway 701 includes the PLC node.

The controller 705 includes one or more processors that are configured to perform operations that are stored in the memory 710. In some implementations, the controller 705 can be configured to detect activity associated with a xDSL network via the xDSL interface 715. The controller 705 can be configured to detect a PLC node associated with a PLC network via the PLC interface 720. The controller 705 can be configured to control the PLC node to transmit one or more measurement frames on a PLC network. The controller 705 can be configured to determine interference to the xDSL network that is caused by the one or more measurement frames. The controller 705 can be configured to control the PLC node to adapt a power mask for its transmissions on the PLC network to reduce interference on the xDSL network. Controlling the PLC node to adapt a power mask can include sending a power mask specification to the PLC node. The PLC node can adapt its power mask based on a received power mask specification.

A communication system can include a first interface to communicate on a digital subscriber line network; a second interface to communicate on a power line communication network; and a controller coupled with the first interface and the second interface. The controller can be configured to detect a power line communication node associated with the power line communication network in response to a detection of activity associated with the digital subscriber line network, the power line communication node being configured to transmit signals on the power line communication network in accordance with a power mask; control the power line communication node to transmit one or more measurement frames on the power line communication network; determine interference on the digital subscriber line network that is caused by the one or more measurement frames transmitted by the power line communication node; and control the power line communication node to adapt the power mask for transmissions on the power line communication network to reduce the interference on the digital subscriber line network.

In some implementations, a detection of activity can include a detection of an activation of a digital subscriber line link. A controller can be configured to monitor an error rate associated with the digital subscriber line network, cause the power line communication node to transmit one or more measurement frames on the power line communication network in response to the error rate exceeding a threshold, and control the power line communication node to adapt a different power mask for its transmissions on the power line communication network to reduce interference on the digital subscriber line network.

In some implementations, a controller is configured to communicate with a domain master associated with the power line communication network to control the power line communication node to adapt the power mask. In some implementations, the domain master is configured to send a frame that contains a power mask specification to the power line communication node. The power mask specification can include an indication of one or more frequency bands. The power mask specification can include one or more power reduction parameters to respectively limit power output in the one or more frequency bands.

Measurement frames can include one or more trains of MAP-D frames. In some implementations, a controller can be configured to control the power line communication node to transmit the one or more trains of MAP-D frames during first MAC cycles, and control the power line communication node to be silent during second MAC cycles. In some implementations, the controller can be configured to measure active interference during the first MAC cycles, measure baseline interference during the second MAC cycles, and determine power line communication interference based on a comparison of the active interference and the baseline interference. In some implementations, a controller can be configured to detect activity associated with the digital subscriber line network. In some implementations, a controller can be configured to control the power line communication node to transmit the one or more measurement frames in response to a detection of the activity associated with the digital subscriber line network.

A communication apparatus can include circuitry configured to communicate with a power line communication node associated with a power line communication network, the power line communication node being configured to transmit signals on the power line communication network in accordance with a power mask; circuitry configured to communicate with a digital subscriber line network and to measure interference on the digital subscriber line network that is associated with the power line communication network; and a controller. The controller can be configured to control the power line communication node to transmit one or more measurement frames on the power line communication network, determine interference on the digital subscriber line network that is caused by the one or more measurement frames transmitted by the power line communication node, and control the power line communication node to adapt the power mask for transmissions on the power line communication network to reduce interference on the digital subscriber line network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Other embodiments fall within the scope of the following claims.

What is claimed is:

1. A method for reducing interference in one or more networks including (i) a digital subscriber line network and (ii) a power line communication network, the method comprising:

detecting a power line communication node associated with the power line communication network in response to a detection of activity associated with the digital subscriber line network, wherein the power line communication node is configured to transmit signals on the power line communication network in accordance with a power mask;

controlling the power line communication node to transmit one or more measurement frames on the power line communication network;

determining interference on the digital subscriber line network that is caused by the one or more measurement frames transmitted by the power line communication node, wherein determining the interference comprises (i) measuring active interference during first medium access control (MAC) cycles, (ii) measuring baseline interference during second MAC cycles, and (iii) determining power line communication interference based on a comparison of the active interference and the baseline interference; and controlling the power line communication node to adapt the power mask for transmissions on the power line communication network to reduce the interference on the digital subscriber line network.

2. The method of claim 1, comprising:

monitoring an error rate associated with the digital subscriber line network;

causing the power line communication node to transmit one or more measurement frames on the power line communication network in response to the error rate exceeding a threshold; and controlling the power line communication node to adapt a different power mask for its transmissions on the power line communication network to reduce interference on the digital subscriber line network.

3. The method of claim 1, wherein the detection of activity comprises a detection of an activation of a digital subscriber line link.

4. The method of claim 1, wherein controlling the power line communication node to adapt the power mask comprises communicating with a domain master associated with the power line communication network, and wherein the domain master is configured to send a frame that contains a power mask specification to the power line communication node.

5. The method of claim 1, wherein controlling the power line communication node to transmit the one or more measurement frames comprises:

controlling the power line communication node to transmit one or more trains of Medium Access Plan Default (MAP-D) frames during the first MAC cycles; and controlling the power line communication node to be silent during the second MAC cycles.

6. A system comprising:

a first interface to communicate on a digital subscriber line network;

a second interface to communicate on a power line communication network; and a controller coupled with the first interface and the second interface, wherein the controller is configured to detect a power line communication node associated with the power line communication network in response to a detection of activity associated with the digital subscriber line network, the power line communication node being configured to transmit signals on the power line communication network in accordance with a power mask;

control the power line communication node to transmit one or more measurement frames on the power line communication network;

determine interference on the digital subscriber line network that is caused by the one or more measurement frames transmitted by the power line communication node, the interference being determined by (i) measuring active interference during first medium access control (MAC) cycles, (ii) measuring baseline interference during second MAC cycles, and (iii) determining power line communication interference based on a comparison of the active interference and the baseline interference; and control the power line communication node to adapt the power mask for transmissions on the power line communication network to reduce the interference on the digital subscriber line network.

7. The system of claim 6, wherein the controller is configured to monitor an error rate associated with the digital subscriber line network, cause the power line communication node to transmit one or more measurement frames on the power line communication network in response to the error rate exceeding a threshold, and control the power line communication node to adapt a different power mask for its transmissions on the power line communication network to reduce interference on the digital subscriber line network.

8. The system of claim 6, wherein the detection of activity comprises a detection of an activation of a digital subscriber line link.

9. The system of claim 6, wherein the controller is configured to communicate with a domain master associated with the power line communication network to control the power line communication node to adapt the power mask, and wherein the domain master is configured to send a frame that contains a power mask specification to the power line communication node.

10. The system of claim 9, wherein the power mask specification comprises an indication of one or more frequency bands, and wherein the power mask specification comprises one or more power reduction parameters to respectively limit power output in the one or more frequency bands.

11. The system of claim 6, wherein the one or more measurement frames comprise one or more trains of Medium Access Plan Default (MAP-D) frames, and wherein the controller is configured to control the power line communication node to transmit the one or more trains of Medium Access Plan Default (MAP-D) frames during the first MAC cycles, and control the power line communication node to be silent during the second MAC cycles.

12. An apparatus comprising:

first circuitry configured to communicate with a power line communication node associated with a power line communication network, the power line communication node being configured to transmit signals on the power line communication network in accordance with a power mask;

second circuitry configured to communicate with a digital subscriber line network and to measure interference on the digital subscriber line network that is associated with the power line communication network; and a controller configured to control the power line communication node to transmit one or more measurement frames on the power line communication network, measure active interference during first medium access control (MAC) cycles associated with the one or more measurement frames, measure baseline interference during second MAC cycles, determine interference on the digital subscriber line network that is caused by the one or more measurement frames transmitted by the power line communication node based on a comparison of the active interference and the baseline interference, and control the power line communication node to adapt the power mask for transmissions on the power line communication network to reduce interference on the digital subscriber line network.

13. The apparatus of claim 12, wherein the controller is configured to detect activity associated with the digital subscriber line network, and wherein the controller is configured to control the power line communication node to transmit the one or more measurement frames in response to a detection of the activity associated with the digital subscriber line network.

14. The apparatus of claim 12, wherein the controller is configured to
- monitor an error rate associated with the digital subscriber line network,
- cause the power line communication node to transmit one or more measurement frames on the power line communication network in response to the error rate exceeding a threshold, and
- control the power line communication node to adapt a different power mask for its transmissions on the power line communication network to reduce interference on the digital subscriber line network.

15. The apparatus of claim 12, wherein the controller is configured to communicate with a domain master associated with the power line communication network to control the power line communication node to adapt the power mask, and wherein the domain master is configured to send a frame that contains a power mask specification to the power line communication node.

16. The apparatus of claim 15, wherein the power mask specification comprises an indication of one or more frequency bands, and wherein the power mask specification comprises one or more power reduction parameters to respectively limit power output in the one or more frequency bands.

17. The apparatus of claim 12, wherein the one or more measurement frames comprise one or more trains of Medium Access Plan Default (MAP-D) frames, and wherein the controller is configured to
- control the power line communication node to transmit the one or more trains of Medium Access Plan Default (MAP-D) frames during the first MAC cycles, and
- control the power line communication node to be silent during the second MAC cycles.

\* \* \* \* \*